(12) United States Patent
Arata (10) Patent No.: US 10,255,485 B2
(45) Date of Patent: Apr. 9, 2019

(54) IDENTIFICATION DEVICE, IDENTIFICATION METHOD, AND RECORDING MEDIUM RECORDING IDENTIFICATION PROGRAM

(71) Applicant: Panasonic Intellectual Property Management Co., Ltd., Osaka (JP)

(72) Inventor: Koji Arata, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 87 days.

(21) Appl. No.: 15/482,844

(22) Filed: Apr. 10, 2017

(65) Prior Publication Data

US 2017/0316255 A1  Nov. 2, 2017

(30) Foreign Application Priority Data

Apr. 28, 2016 (JP) ................. 2016-091760

(51) Int. Cl.
*G06K 9/00* (2006.01)
*G06T 7/73* (2017.01)
*G06T 7/246* (2017.01)

(52) U.S. Cl.
CPC ..... *G06K 9/00288* (2013.01); *G06K 9/00228* (2013.01); *G06K 9/00342* (2013.01); *G06K 9/00355* (2013.01); *G06K 9/00362* (2013.01); *G06K 9/00369* (2013.01); *G06K 9/00375* (2013.01); *G06K 9/00838* (2013.01); *G06K 9/00993* (2013.01); *G06T 7/246* (2017.01); *G06T 7/251* (2017.01); *G06T 7/73* (2017.01);

(Continued)

(58) Field of Classification Search
CPC ....... G06T 7/246; G06T 7/73; G06K 9/00228; G06K 9/00288; G06K 9/00342; G06K 9/00362; G06K 9/00838; G06K 9/00355; G06K 9/00369; G06K 9/00375; G06K 9/00993
See application file for complete search history.

(56) References Cited

U.S. PATENT DOCUMENTS

| 6,498,628 B2* | 12/2002 | Iwamura | ................ G08C 23/00 345/157 |
| 7,925,049 B2* | 4/2011 | Zhu | .......................... G06K 9/32 382/103 |

(Continued)

FOREIGN PATENT DOCUMENTS

JP  2010-211705  9/2010

OTHER PUBLICATIONS

The Extended European Search Report dated Aug. 14, 2017 for the related European Patent Application No. 17167230.6.

*Primary Examiner* — Mia M Thomas
(74) *Attorney, Agent, or Firm* — Greenblum & Bernstein, P.L.C.

(57) ABSTRACT

An identification device includes an inputter which receives image information of a person photographed by a camera, and a controller which identifies the person and detects parts, which are at least a head and hands, of the person based on the image information, thereby identifying a motion of the person based on the identified person, the detected parts, and a motion model in which a motion of a person is registered for every person, and outputs the identified motion of the person.

6 Claims, 8 Drawing Sheets

(52) U.S. Cl.
CPC ............... *G06T 2207/10016* (2013.01); *G06T 2207/30201* (2013.01)

(56) References Cited

U.S. PATENT DOCUMENTS

| | | | | |
|---|---|---|---|---|
| 8,830,312 | B2* | 9/2014 | Hummel | G06K 9/6202 |
| | | | | 348/77 |
| 8,929,612 | B2* | 1/2015 | Ambrus | G06K 9/00362 |
| | | | | 382/115 |
| 9,092,665 | B2* | 7/2015 | Stoppa | G06K 9/00355 |
| 9,098,766 | B2* | 8/2015 | Dariush | G06K 9/00362 |
| 9,904,845 | B2* | 2/2018 | Dariush | G06K 9/00369 |
| 2002/0075334 | A1* | 6/2002 | Yfantis | G06F 3/017 |
| | | | | 715/863 |
| 2003/0133599 | A1* | 7/2003 | Tian | G06K 9/00308 |
| | | | | 382/118 |
| 2005/0232467 | A1* | 10/2005 | Mohri | G06F 3/014 |
| | | | | 382/103 |
| 2006/0269145 | A1* | 11/2006 | Roberts | G06K 9/00369 |
| | | | | 382/228 |
| 2011/0102570 | A1* | 5/2011 | Wilf | G06F 3/017 |
| | | | | 348/77 |
| 2011/0298827 | A1 | 12/2011 | Perez | |
| 2013/0069940 | A1* | 3/2013 | Sun | G09B 19/003 |
| | | | | 345/419 |
| 2013/0300659 | A1* | 11/2013 | Kang | G06F 3/017 |
| | | | | 345/158 |
| 2014/0198031 | A1* | 7/2014 | Xiong | G06F 3/017 |
| | | | | 345/156 |
| 2015/0177842 | A1* | 6/2015 | Rudenko | G06F 3/017 |
| | | | | 345/156 |
| 2016/0027187 | A1* | 1/2016 | Wang | G06T 7/73 |
| | | | | 382/164 |
| 2017/0192753 | A1* | 7/2017 | Karmon | G06F 8/30 |
| 2017/0193289 | A1* | 7/2017 | Karmon | G06K 9/00355 |
| 2017/0236302 | A1* | 8/2017 | Arth | G06T 7/74 |
| | | | | 382/103 |
| 2017/0337743 | A1* | 11/2017 | Metzler | G06T 7/73 |
| 2018/0004772 | A1* | 1/2018 | Itani | G06F 3/017 |
| 2018/0259341 | A1* | 9/2018 | Aboutalib | G06T 7/579 |
| 2018/0336400 | A1* | 11/2018 | Aronson | G06K 9/00288 |
| 2018/0365848 | A1* | 12/2018 | Lee | G06T 7/536 |

* cited by examiner

| PERSON INFORMATION | SKELETON INFORMATION | | | MOTION INFORMATION |
|---|---|---|---|---|
| | HEAD POSITION | LEFT HAND POSITION | RIGHT HAND POSITION | |
| 1 | 171,128 | 224,322 | 162,305 | 1 |
| ⋮ | ⋮ | ⋮ | ⋮ | ⋮ |
| 2 | ○○,○○ | △△,△△ | □□,□□ | 1 |
| ⋮ | ⋮ | ⋮ | ⋮ | ⋮ |
| 3 | ◇◇,◇◇ | ▽▽,▽▽ | ○○,○○ | 1 |
| ⋮ | ⋮ | ⋮ | ⋮ | ⋮ |

1003

PERSON INFORMATION: INFORMATION REPRESENTING CORRESPONDENCE OF PERSON WITH RESPECT TO REGISTERED PERSON
SKELETON INFORMATION: INFORMATION OF SKELETON POSITION OF PERSON
MOTION INFORMATION: INFORMATION CORRESPONDING TO KIND OF MOTION

FIG. 4

| PERSON INFORMATION | PART INFORMATION | | | MOTION INFORMATION |
|---|---|---|---|---|
| | HEAD POSITION | LEFT HAND POSITION | RIGHT HAND POSITION | |
| 2 | 152,121 | 111,221 | 251,110 | ? |

2001

| PERSON INFORMATION | SKELETON INFORMATION | | | MOTION INFORMATION |
|---|---|---|---|---|
| | HEAD POSITION | LEFT HAND POSITION | RIGHT HAND POSITION | |
| 1 | 171,128 | 224,322 | 162,305 | 1 |
| ⋮ | ⋮ | ⋮ | ⋮ | ⋮ |
| 2 | ○○,○○ | △△,△△ | □□,□□ | 1 |
| ⋮ | ⋮ | ⋮ | ⋮ | ⋮ |
| 2 | 151,117 | 111,233 | 254,120 | 6 |
| ⋮ | ⋮ | ⋮ | ⋮ | ⋮ |

IDENTIFICATION DEVICE, IDENTIFICATION METHOD, AND RECORDING MEDIUM RECORDING IDENTIFICATION PROGRAM

BACKGROUND

1. Technical Field

The present disclosure relates to an identification device, an identification method, and a recording medium recording an identification program.

2. Description of the Related Art

The technique for identifying a posture of a person has been known in recent years.

Japanese Unexamined Patent Application Publication No. 2010-211705, for example, discloses a device which detects positions of feature points of hands, elbows, and shoulders of a person from an image taken by a camera and corrects the positions of the feature points of hands, elbows, and shoulders so that the positions match with a preliminarily-generated joint model.

SUMMARY

However, there has been a problem in which in the case where a person is wearing cloths, which have a low reflection rate with respect to near infrared light, such as a leather jacket, pixel values of the body and the arms are not correctly obtained, therefore, joints on the shoulders and the elbows cannot be detected, and accordingly, a posture of the person cannot be identified, in the device described in Japanese Unexamined Patent Application Publication No. 2010-211705.

One non-limiting and exemplary embodiment facilitates providing an identification device, an identification method, and a recording medium recording an identification program, by which a posture of a person can be identified.

In one general aspect, the techniques disclosed here feature an identification device including an inputter which receives image information of a person photographed by a camera, and a controller which identifies the person and detects parts, which are at least a head and hands, of the person based on the image information, thereby identifying a motion of the person based on the identified person, the detected parts, and a motion model in which a motion of a person is registered for every person, and outputs the identified motion of the person.

The "person" here does not limitedly represent a specific individual but represents a general person having arbitrary age, sex, and physical size.

According to the present disclosure, a posture of a person can be identified.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure will be described in detail below with reference to the accompanying drawings. Here, in the embodiments, components having the same functions will be denoted with the same reference numerals and duplicated description thereof will be omitted.

Figure 1A:
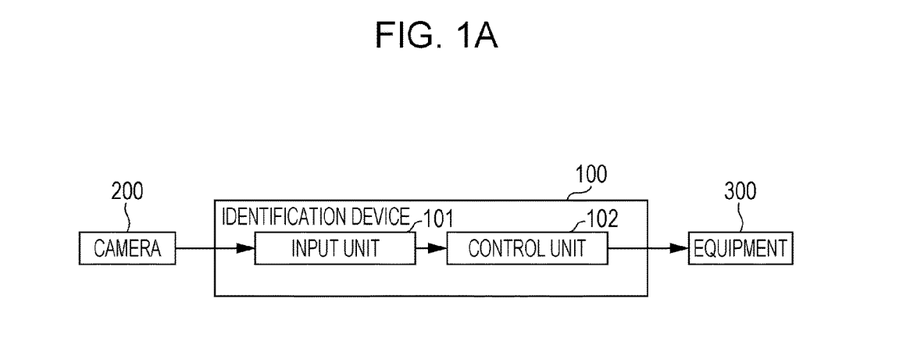
FIG. 1A is a block diagram illustrating an example of the configuration of an identification device according to an embodiment of the present disclosure.

An example of the configuration of an identification device 100 according to an embodiment of the present disclosure will be first described with reference to FIG. 1A. FIG. 1A is a block diagram illustrating an example of the configuration of the identification device 100 according to the embodiment of the present disclosure.

The identification device 100, a camera 200, and equipment 300 illustrated in FIG. 1A are mounted on a moving body such as a motorcar, a rail vehicle, a ship, and aircraft. In the present embodiment, the case where the identification device 100, the camera 200, and the equipment 300 are mounted on a motorcar will be described as an example.

The camera 200 is a ranging camera such as a stereo camera and a time of flight (TOF) type camera, for example. The camera 200 takes pictures in a range in which a person exists in a vehicle interior so as to acquire image information and outputs the image information to the identification device 100. The image information includes at least a near infrared image representing magnitude of reflection intensity of near infrared light. Further, in the case where the camera 200 is a stereo camera or a TOF camera, the image information may further include a distance image representing perspective.

The equipment 300 is equipment used in a motorcar. Examples of the equipment 300 include a car navigation system, an audio device, an air conditioner device, a tablet, a smartphone, a rear camera, a side camera, a front camera, and an ETC on-vehicle device. Further, examples of the equipment 300 may include a handle, a shift lever (gear lever), a winker lever (winker switch), a wiper lever (wiper switch), a door lock switch, an up and down switch of a powered window, an engine start switch, an accelerator pedal, a brake pedal, and a clutch pedal.

The equipment 300 is connected with the identification device 100 via a wired network (for example, controller area network (CAN)), a radio network (for example, wireless local area network (LAN)), or a network in which the wired network and the radio network are mixed. In this state, the equipment 300 is controlled based on a control signal received from the identification device 100.

The identification device 100 includes an input unit 101 and a control unit 102.

The input unit 101 receives image information of a person from the camera 200 and outputs the image information to the control unit 102.

The control unit 102 identifies the person and detects at least parts which are a head and hands of the person based on the image information received from the input unit 101 so as to identify a motion of the person based on the identified person, the detected parts, and a motion model in which a motion of a person is registered for every person. With such configuration, the control unit 102 is capable of identifying a posture of a person.

Figure 1B:
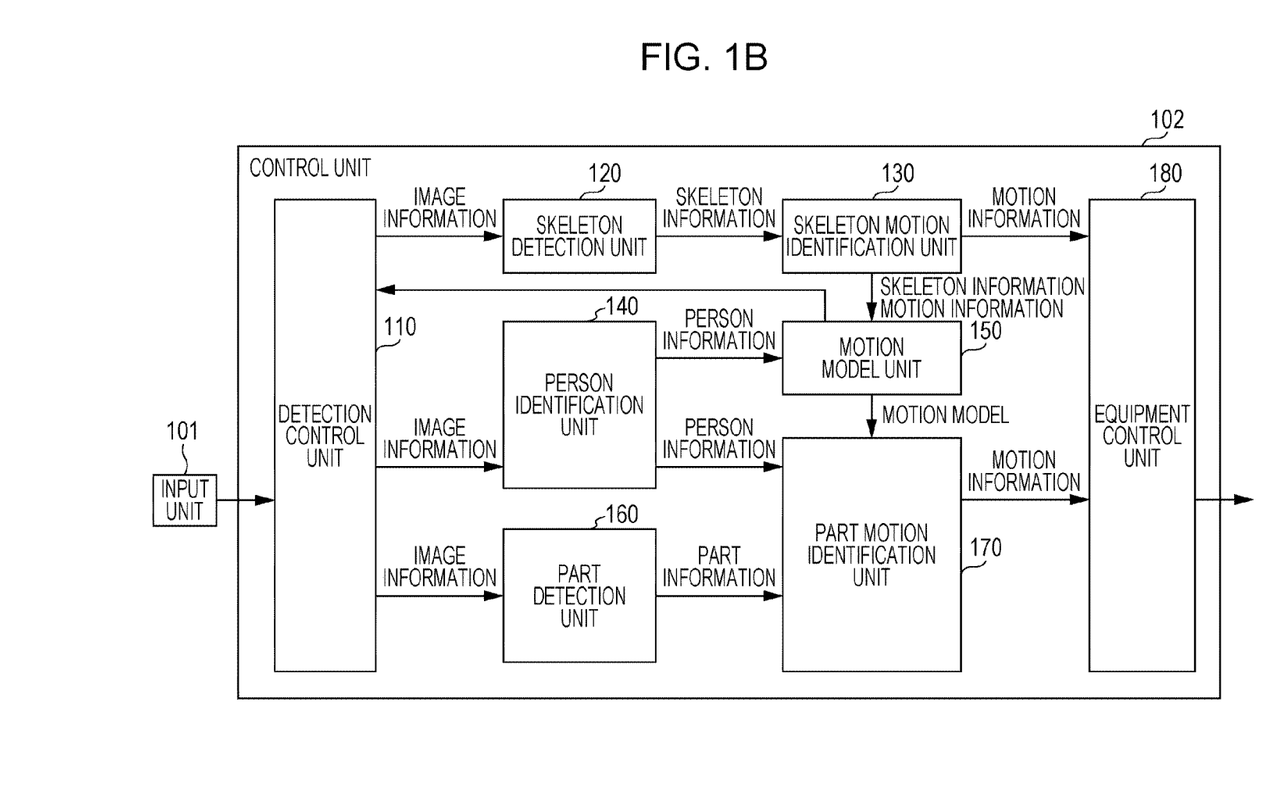
FIG. 1B is a block diagram illustrating an example of the configuration of a control unit.

An example of the configuration of the control unit 102 will now be described with reference to FIG. 1B. FIG. 1B is a block diagram illustrating an example of the configuration of the control unit.

As illustrated in FIG. 1B, the control unit 102 includes a detection control unit 110, a skeleton detection unit 120, a skeleton motion identification unit 130, a person identification unit 140, a motion model unit 150, a part detection unit 160, a part motion identification unit 170, and an equipment control unit 180.

The detection control unit 110 receives image information from the camera 200, analyzes the image information, and outputs the image information to the skeleton detection unit 120, the person identification unit 140, and the part detection unit 160. Specifically, the detection control unit 110 determines whether or not skeleton detection is possible based on the analysis of image information. When the detection control unit 110 determines that skeleton detection is possible, the detection control unit 110 outputs the image information to the skeleton detection unit 120 and the person identification unit 140. On the other hand, when the detection control unit 110 determines that skeleton detection is impossible, the detection control unit 110 further determines whether or not a motion model, which will be described later, is available. When the detection control unit 110 determines that the motion model is available, the detection control unit 110 outputs the image information to the person identification unit 140 and the part detection unit 160. The determination of whether or not skeleton detection is possible will be described later.

The skeleton detection unit 120 detects skeleton positions of a person based on the image information received from the detection control unit 110 and outputs skeleton information representing a result of the detection to the skeleton motion identification unit 130. Skeleton positions of a person represent positions of representative points representing regions of a head, a neck, a waist, shoulders, elbows, hands, and the like. The positions of the representative points are specified as two-dimensional coordinates on an image.

Figure 2:
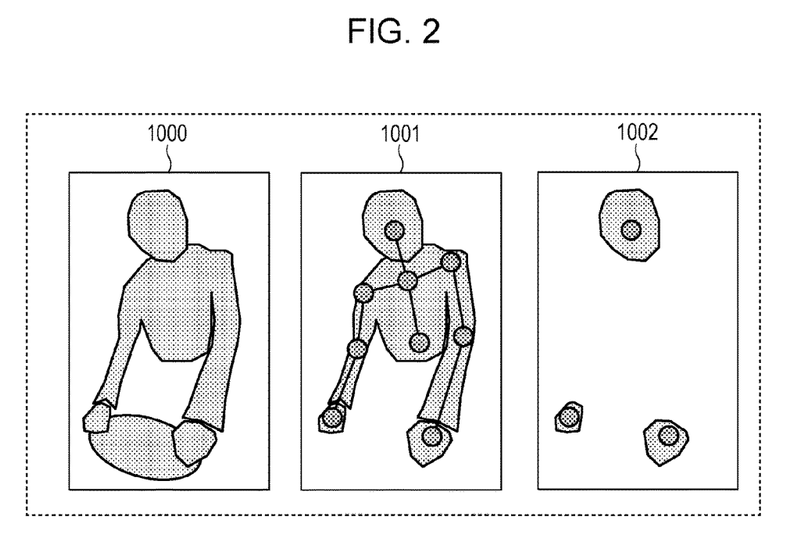
FIG. 2 is an explanatory diagram illustrating an example of skeleton detection processing.

FIG. 2 illustrates an example of skeleton detection processing. An image 1000 is an example of an image obtained by photographing a person and is a schematic view of an image in which a person driving a motorcar is gripping a handle. An image 1001 is an example of a result image obtained by detecting skeleton positions of the person in the image 1000 and shows a state obtained through the detection of positions of nine points which are representative points of a head, a neck, a waist, a left shoulder, a left elbow, a left hand, a right shoulder, a right elbow, and a right hand. Skeleton information represents position coordinates of the detected representative points and are obtained as position coordinates (X1, Y1), (X2, Y2), . . . , and (X9, Y9) of nine representative points on the image. Skeleton detection can be realized by using an existing method as the one described in Japanese Unexamined Patent Application Publication No. 2010-211705, for example.

Since the positions of nine points which are representative points of a head, a neck, a waist, a left shoulder, a left elbow, a left hand, a right shoulder, a right elbow, and a right hand can be detected in the image 1001, the detection control unit 110 determines that skeleton detection is possible. Meanwhile, an image 1002 illustrates an example of a result image which is obtained by detecting skeleton positions of a photographed person who is wearing cloths, which have a low reflection rate with respect to near infrared light, such as a leather jacket. It is understood that positions of only three points which are representative points of a head, a left hand, and a right hand can be detected in the image 1002. In this case, the detection control unit 110 determines that skeleton detection is impossible.

The skeleton motion identification unit 130 identifies a motion of an occupant based on the skeleton information received from the skeleton detection unit 120. A motion of an occupant is a motion for operating equipment such as an air conditioner device, a handle, and an audio device, searching a thing in driving, a motion such as turning around, and the like, for example.

Identification of a motion based on skeleton information can be performed by using an existing method such as a method for specifying one of default patterns through a plurality of times of size comparison based on the tree structure of comparison object parameters, that is, the random forests, for example.

The skeleton motion identification unit 130 outputs motion information representing an identification result of a motion, as the one mentioned above, of an occupant and skeleton information to the motion model unit 150. Further, the skeleton motion identification unit 130 outputs the motion information to the equipment control unit 180.

The person identification unit 140 identifies who the person is based on the image information received from the detection control unit 110 and outputs person information representing the result of the identification to the motion model unit 150 and the part motion identification unit 170.

Person identification may be realized by using an existing technique of face authentication, for example. For example, face images of a plurality of persons who drive a motorcar are preliminarily registered, a face image is acquired when one of these persons actually drives the motorcar, and the acquired face image is collated with the registered face images by using an existing technique so as to be able to identify which registered person the driver is. As an existing technique of face identification, there is a method in which a feature amount of a face is acquired by a method of local binary pattern (LBP) or histogram of oriented gradient (HOG) and the feature amount is collated.

The motion model unit 150 generates a motion model based on the motion information and the skeleton information received from the skeleton motion identification unit 130 and the person information received from the person identification unit 140 to store the motion model and outputs the stored motion model to the part motion identification unit 170.

Figure 3:
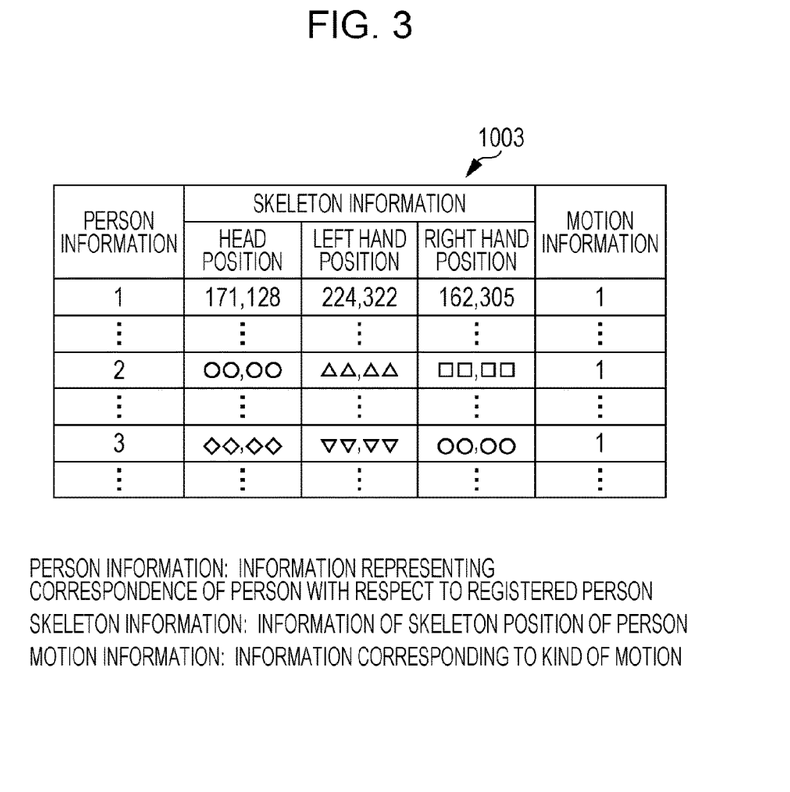
FIG. 3 is an explanatory diagram illustrating an example of a motion model.

A motion model is formed in a database such that person information (a registration number corresponding to a registered person), skeleton information (position coordinates of feature points of a skeleton), and motion information (a motion number corresponding to a kind of a motion) are stored in an associated manner. Here, as skeleton information, not all pieces of feature point information outputted from the skeleton detection unit 120 are registered, but only pieces of information of feature points of a head, a left hand, and a right hand which are detection objects in part detection processing in the part detection unit 160 which will be described later are registered. FIG. 3 illustrates an association database 1003, in which person information, skeleton information of a head, a left hand, and a right hand, and motion information are associated with each other, as an example.

In the present embodiment, a database of a motion model becomes available after a certain number of pieces of skeleton information, which are detected in a state that skeleton detection by the skeleton detection unit 120 is possible, person information, and motion information can be accumulated. For example, it is necessary to accumulate 10000 or more combinations of person information, skeleton information, and motion information to make a database of motion models available.

The motion model unit 150 outputs state information representing whether or not a motion model is available to the detection control unit 110. The detection control unit 110 branches processing in accordance with whether or not the motion model is available.

The part detection unit 160 detects a head position, a left hand position, and a right hand position as part information of a person based on the image information received from the detection control unit 110 and outputs part information, which is a result of the detection, to the part motion identification unit 170.

Though position coordinates of a plurality of feature points including a head position, a left hand position, and a right hand position are detected also in the skeleton detection unit 120 described above, a detection method in a case where image information of body parts of a person cannot be obtained in a normal way is used.

As a method for realizing detection of part information by a combination of existing methods, for example, a method can be used in which a group of distance information existing with equal distances is detected by using distance information included in image information and the position of the group is tracked in a plurality of frames.

The part motion identification unit 170 identifies a motion of an occupant based on the person information from the person identification unit 140, the motion model from the motion model unit 150, and the part information from the part detection unit 160.

A method of part motion identification processing in which a motion of an occupant is identified in the part motion identification unit 170 will be described with reference to FIG. 4.

In the part motion identification processing, the part motion identification unit 170 collates person information and part information in input information 2001 of the part motion identification unit 170 with person information and skeleton information in registration information 2002 which is already registered as a motion model so as to retrieve, from the registration information 2002, data whose person information is accorded with the person information in the input information and whose skeleton information is closest to the part information in the input information.

As a method for retrieving registration information including skeleton information closest to part information of input information, the following method can be employed, for example. First, distances between corresponding parts (for example, between head positions, between left hand positions, and between right hand positions) are respectively calculated between input information and registration information. Then, registration information in a case where a sum of the calculated distances between respective couples of parts is the smallest is determined as registration information including skeleton information closest to part information of the input information.

In collation between input information and registration information, it is ideal to retrieve data whose person information is accorded with person information in the input information and whose skeleton information is accorded with part information in the input information when accuracy in identification of a motion is taken into account. However, it is conceivable that there is no skeleton information, which is accorded with part information of the input information, in the registration information because movement of a person who makes a predetermined motion is not always the same.

In view of such case, data whose person information is accorded with person information in input information and whose skeleton information is closest to part information in the input information is retrieved when the input information is collated with the registration information, in the present embodiment.

Figure 4:
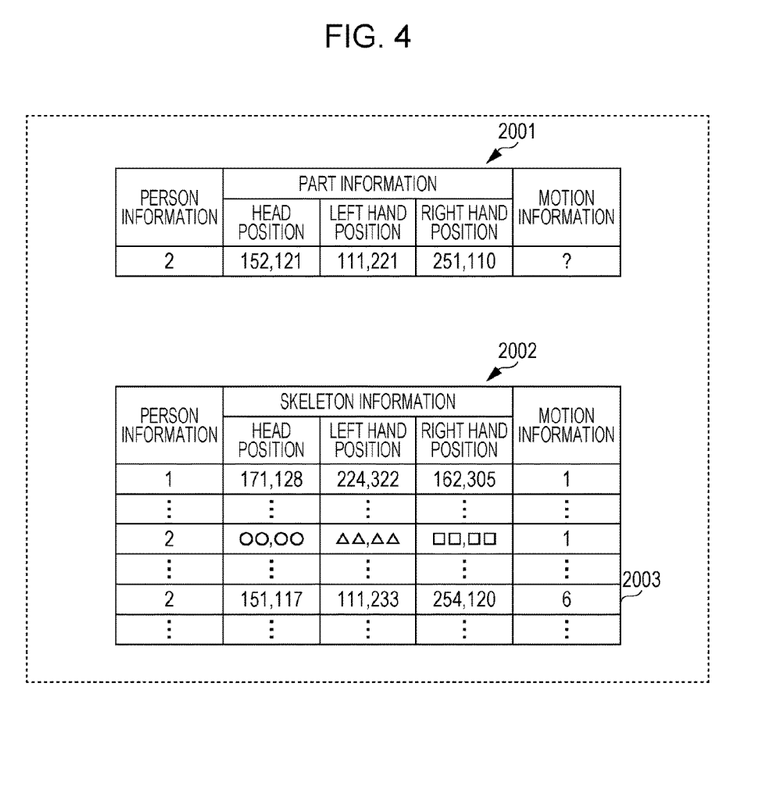
FIG. 4 is an explanatory diagram illustrating a state in which person information and part information are compared to a motion model in the embodiment of the present disclosure.

In the case of the example of FIG. 4, data of the input information 2001 is closest to data 2003 in data of the registration information 2002, so that the part motion identification unit 170 identifies motion information as "6" and outputs part motion information to the equipment control unit 180.

The equipment control unit 180 generates control information for controlling the equipment 300 (FIG. 1A) based on the motion information from the skeleton motion identification unit 130 or the motion information from the part motion identification unit 170 and outputs the generated control information to the equipment 300.

The equipment 300 is controlled based on the control information received from the equipment control unit 180.

Here, though the control unit 102 is configured to include the skeleton detection unit 120 and the skeleton motion identification unit 130 in the example of FIG. 1B, the control unit 102 may be configured not to include the skeleton detection unit 120 and the skeleton motion identification unit 130. Detailed description will be provided later.

Further, though the control unit 102 is configured to include the equipment control unit 180 in the example of FIG. 1B, the equipment control unit 180 may be provided in a manner to be separate from the control unit 102.

That is, the control unit 102 may be configured to include at least the detection control unit 110, the person identification unit 140, the motion model unit 150, the part detection unit 160, and the part motion identification unit 170.

Figure 5:
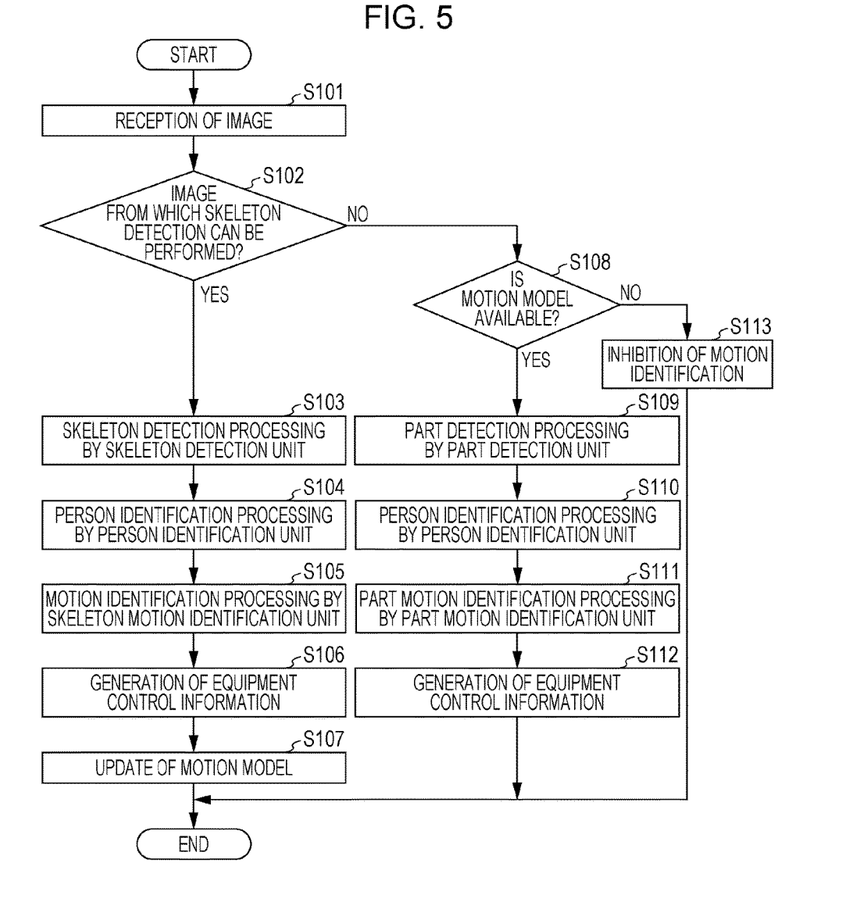
FIG. 5 is a flow diagram illustrating chief operations of the identification device according to the embodiment of the present disclosure.

An example of an operation of the control unit 102 according to the present embodiment will now be described with reference to FIG. 5. FIG. 5 is a flow diagram illustrating an example of a flow of the operation of the control unit 102 according to the present embodiment.

In step S101, the detection control unit 110 first receives image information from the camera 200 via the input unit 101. The image information is an image obtained by photographing an occupant as described above.

Subsequently, in step S102, the detection control unit 110 determines whether or not the image is an image from which skeleton detection can be performed, based on the image information. Specifically, when the detection control unit 110 can detect positions of all representative points, which are to be detected, from the image information, the detection control unit 110 determines that the image is an image from which skeleton detection can be performed. When the detection control unit 110 can detect only positions of part of representative points, which are to be detected, from the image information, the detection control unit 110 determines that the image is not an image from which skeleton detection can be performed.

When it is determined that the image is an image from which skeleton detection can be performed in step S102 (step S102: YES), the processing goes to step S103 and the skeleton detection unit 120 performs skeleton detection processing in step S103.

Subsequently, the person identification unit 140 performs person identification processing in step S104, the skeleton motion identification unit 130 performs motion identification processing in step S105 following step S104, and the equipment control unit 180 performs equipment control information generation processing in step S106 following step S105.

In step S107 following step S106, the motion model unit 150 updates motion models based on skeleton information identified in the skeleton detection processing in step S103, person information identified in the person identification processing in step S104, and motion information identified in the motion identification processing in step S105. Specifically, the motion model unit 150 adds the skeleton information, the person information, and the motion information which are obtained to a database of motion models. Here, performing orders of step S106 and step S107 may be inverted or step S106 and step S107 may be simultaneously performed.

When it is determined that the image is not an image from which skeleton detection can be performed in step S102 (step S102: NO), the processing goes to step S108 and the detection control unit 110 determines whether or nota motion model is available in step S108.

When it is determined that a motion model is available in step S108 (step S108: YES), the processing goes to step S109 and the part detection unit 160 performs part detection processing in step S109.

In step S110 following step S109, the person identification unit 140 performs person identification processing.

In step S111 following step S110, the part motion identification unit 170 performs part motion identification processing based on part information identified in the part detection processing in step S109, person information identified in the person identification processing in step S110, and motion models which are preliminarily stored.

In step S112 following step S111, the equipment control unit 180 performs equipment control information generation processing.

When it is determined that the motion model is not available in step S108 (step S108: NO), the control unit 102 determines that the motion identification processing is impossible, inhibits execution of the motion identification processing, and ends the processing by presenting error information, for example, in step S113.

As described above, in the identification device 100 of the present embodiment, identification of the person and detection of at least parts which are a head and hands of the person are performed based on image information received from the input unit 101 and a motion of the person is identified based on the identified person, the detected parts, and a motion model in which a motion of a person is registered for each person.

In the case where a person is wearing cloths, which have a low reflection rate with respect to near infrared light, such as a leather jacket, distances of the body and arms are not correctly outputted, and therefore, joints on shoulders and elbows cannot be detected, motion identification may be failed only based on part information. However, the identification device 100 of the present embodiment is capable of correctly identifying a motion of a person even in such case.

Further, even though positions of heads, left hands, and right hands of persons are the same respectively, a kind of a motion may vary due to difference in habits in a motion among the persons or difference in those physical sizes, for example. In such case as well, the identification device 100 of the present embodiment identifies a motion of a person based on person information, part information, and a fundamental motion model, so that the identification device 100 absorbs difference in motions made by different persons and can correctly identify a motion.

The embodiment of the present disclosure has been described above, but the present disclosure is not limited to the embodiment. Modifications will be described below.

<Modification 1>

The example in which the identification device 100, the camera 200, and the equipment 300 are provided to a motorcar is described in the above-described embodiment, but the application is not limited to this. The identification device 100, the camera 200, and the equipment 300 may be provided to a moving body other than a motorcar (for example, a rail vehicle, a ship, and aircraft) or may be provided to places other than a moving body.

<Modification 2>

Motion information in registration information whose person information is accorded with person information in input information and whose skeleton information is closest to part information in the input information is identified as motion information of the input information in the part motion identification processing in the above-described embodiment, but the processing is not limited to this.

For example, in the case where person information of input information is accorded with person information of registration information but there is no skeleton information, which is accorded with part information of the input information, in the registration information, a predetermined number of pieces of registration information may be retrieved in an order in which skeleton information of registration information is closer to part information of the input information. When all pieces of motion information in these predetermined number of pieces of registration information are identical to each other, this motion information may be used as motion information in the input information. The number of pieces of registration information to be retrieved is preliminarily determined.

Figure 6:
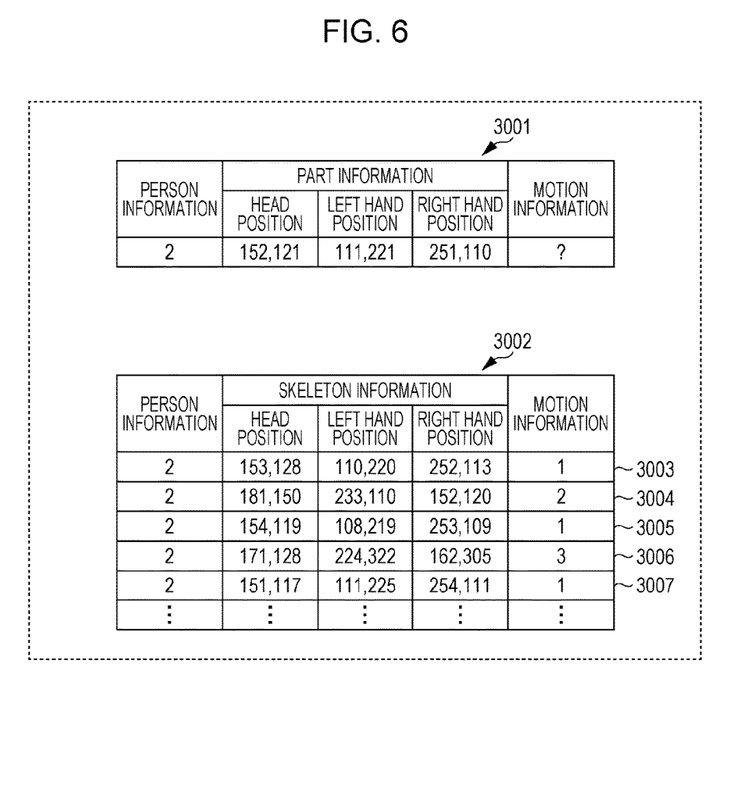
FIG. 6 is an explanatory diagram illustrating a state in which person information and part information are compared to a motion model in Modification 2.

A specific aspect of Modification 2 will be described below with reference to FIG. 6. Here, FIG. 6 illustrates only registration information whose person information is "2" among pieces of registration information so as to simplify description. Further, an example in which the number of pieces of registration information to be retrieved is set to three is described below.

Referring to FIG. 6, in registration information 3002, data 3005 which is the closest, data 3007 which is the second closest, and data 3003 which is the third closest are retrieved as registration information close to part information in input information 3001. In this case, motion information in all of three retrieved data is "1", so that it is determined that motion information in the input information is "1".

Thus, motion identification accuracy is enhanced compared to the case where skeleton information, which is closest to part information in input information, in registration information is merely used. Especially, in a state that the number of pieces of registration information is small, degradation in motion identification accuracy is concerned in the case of use of skeleton information, which is closest to part information in input information, in registration information. Therefore, estimation of motion information performed by using the above-described method is effective.

<Modification 3>

The above-described embodiment takes the aspect in which a database of motion models cannot be used until 10000 or more combinations, for example, of person information, skeleton information, and motion information are accumulated, but limit for using motion models is not limited to this.

Even in the case where the accumulation amount of combinations of person information, skeleton information, and motion information does not reach 10000 combinations, a database of motion models can be permitted to be used when pieces of information by which a certain level of credibility can be secured are accumulated. Further, even in the case where the accumulation amount of combinations of person information, skeleton information, and motion information is small, a database of motion models can be permitted to be used only for a specific motion.

Especially, combination of the method described in Modification 3 and the method described in Modification 2 enables use of a database of motion models while securing motion identification accuracy even in a state that the accumulation amount of combinations of person information, skeleton information, and motion information is small.

<Modification 4>

The above-described embodiment takes the aspect in which a motion model is generated based on an image from which skeleton detection can be performed so as to be stored, but an aspect for storing a motion model is not limited to this. A motion model to be a base (referred to below as a "fundamental motion model") can be preliminarily stored in the identification device 100 when the identification device 100 is shipped.

In a fundamental motion model, standard skeleton information and motion information are registered for every predetermined age, sex, and physical size. This fundamental motion model is preliminarily generated based on data obtained through various types of experiments and/or calculation.

In use of a fundamental motion model, age, sex, a physical size, and the like of an occupant are identified based on image information and an appropriate fundamental motion model is selected from a plurality of fundamental motion models which are stored.

Here, large number of fundamental motion models of different age, sex, and physical size may be stored in the identification device 100 so as to enhance identification accuracy.

<Modification 5>

Modification 5 is obtained such that a database of fundamental motion models and a database of motion models which are generated based on images from which skeleton detection can be performed are separately prepared and the fundamental motion model and the motion model generated based on an image from which skeleton detection can be performed are used in a switched manner in Modification 4.

Specifically, the part motion identification unit 170 uses a fundamental motion model in the case where the accumulation amount of motion models generated based on images from which skeleton detection can be performed is smaller than a predetermined amount, and switches a motion model to be used from the fundamental motion model into a motion model generated based on an image from which skeleton detection can be performed in the case where the accumulation amount of motion models generated based on images from which skeleton detection can be performed becomes equal to or larger than the predetermined amount.

Accordingly, a database of motion models can be used while securing motion identification accuracy even in a state that the accumulation amount of motion models generated based on images from which skeleton detection can be performed is small.

<Modification 6>

Modification 6 is obtained such that a fundamental motion model and a motion model generated based on an image from which skeleton detection can be performed are used in a combined manner in Modification 4.

Specifically, the part motion identification unit 170 uses a fundamental motion model in the case where the accumulation amount of motion models generated based on images from which skeleton detection can be performed is smaller than a predetermined amount, and updates a database of fundamental motion models by using a motion model which is generated, in the case where the motion model is generated based on an image from which skeleton detection can be performed. Specifically, the part motion identification unit 170 adds skeleton information, person information, and motion information which are obtained to the database of fundamental motion models.

Accordingly, a database of motion models can be used while securing motion identification accuracy even in a state that the accumulation amount of motion models generated based on images from which skeleton detection can be performed is small. Further, by taking data of a motion model which is generated based on an image, from which skeleton detection can be performed, and has high credibility into a fundamental motion model, credibility of the motion model can be further enhanced.

<Modification 7>

The above-described embodiment takes the aspect in which a motion model is generated based on an image from which skeleton detection can be performed, but generation of a motion model is not limited to this. For example, when the part motion identification unit 170 identifies motion information by using a motion model, the part motion identification unit 170 may be allowed to feed back person information, part information, and the motion information corresponding to the motion model to the motion model unit 150.

Specifically, the part motion identification unit 170 outputs person information and part information used in the part motion identification processing and motion information identified in the part motion identification processing to the motion model unit 150 after step S111 in the flow diagram of FIG. 5 so as to update motion models in the motion model unit 150.

Accordingly, a motion model can be generated not only based on an image from which skeleton detection can be performed but also based on motion information identified based on person information, part information, and a motion model, dramatically increasing the accumulation amount of motion models. Here, only data having high credibility in motion identification, such as data in which a plurality of pieces of skeleton information in registration information are accorded with part information in input information, are fed back among data outputted from the part motion identification unit, being able to prevent degradation of credibility of motion models.

<Modification 8>

In the above-described embodiment, parts to be detected in the part detection unit 160 are set to three parts which are a head, a left hand, and a right hand which are exposed on the assumption that a driver who is an occupant is wearing long-sleeved cloths which have a low reflection rate with respect to near infrared light. However, parts to be detected in the part detection unit 160 are not limited to these. The number of parts to be detected may be smaller than three parts or larger than three parts. Further, predetermined parts among upper extremities such as elbows and shoulders may be detected instead of hands (from wrists to fingertips). Alternatively, predetermined parts among upper extremities such as elbows and shoulders may be detected in addition to hands (from wrists to fingertips).

When the case where a driver is wearing a short-sleeved cloth and gloves which have a low reflection rate with respect to near infrared light is considered, for example, a head can be detected but hands cannot be detected, being impossible to perform part motion identification processing in the above-described embodiment. However, if elbows are detected instead of hands, the part motion identification processing can be performed.

Further, in the case where a driver seat is on the right side in the vehicle traveling direction, the driver often operates the equipment 300 by his/her left hand. Therefore, if parts to be detected are set as a head and one or more parts among upper left extremities, a motion of the driver can be correctly identified even though the number of detection parts is reduced because these detection parts often moves.

<Modification 9>

The above-described embodiment takes the aspect in which only skeleton information of parts, which are detection objects in part detection processing of the part detection unit 160, is registered as skeleton information stored in a motion model, but kinds of skeleton information to be stored in a motion model are not limited to this.

For example, information of the whole skeleton may be stored in a motion model. In this case, the part motion identification unit 170 collates part information of parts which can be detected from image information with skeleton information of parts corresponding to the parts which can be detected from the image information respectively, in the skeleton information in the motion model.

Accordingly, part motion identification processing can be performed even in the case where a combination of parts which can be detected varies.

The embodiment and modifications of the present disclosure have been described thus far.

Figure 7:
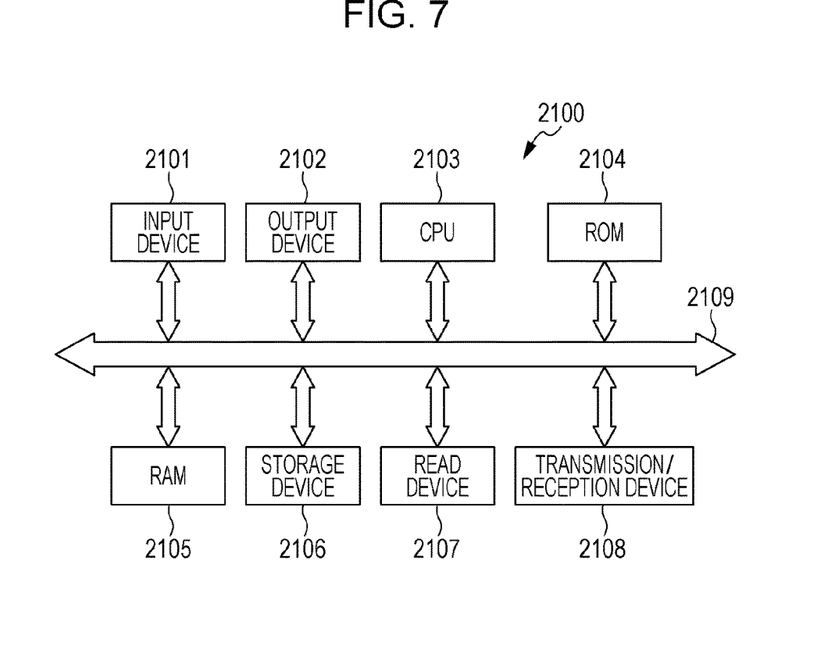
FIG. 7 illustrates an example of the hardware configuration of a computer which realizes functions of components by a program.

FIG. 7 illustrates the hardware configuration of a computer which realizes functions of components in the above-described embodiment and modifications by a program.

As illustrated in FIG. 7, a computer 2100 includes an input device 2101 such as an input button and a touch pad, an output device 2102 such as a display and a speaker, a central processing unit (CPU) 2103, a read only memory (ROM) 2104, and a random access memory (RAM) 2105. The computer 2100 further includes a storage device 2106 such as a hard disk device and a solid state drive (SSD), a read device 2107 which reads information from a recording medium such as a digital versatile disk read only memory (DVD-ROM) and a universal serial bus (USB) memory, and a transmission/reception device 2108 which performs communication via a network. The above-mentioned components are mutually connected via a bus 2109.

The read device 2107 reads a program for realizing the functions of the above-described components from a recording medium recording the program and allows the storage device 2106 to store the program. Alternatively, the transmission/reception device 2108 communicates with a server device which is connected to a network and allows the storage device 2106 to store the program for realizing the functions of the above-described components which is downloaded from the server device.

Then, the CPU 2103 copies the program stored in the storage device 2106 on the RAM 2105 and sequentially reads a command included in the program from the RAM 2105 to execute the command. Thus, the functions of the above-described components are realized. Further, in execution of the program, pieces of information obtained through the various types of processing described in the embodiment are stored in the RAM 2105 or the storage device 2106 so as to be used as appropriate.

The identification device, the identification method, and the recording medium recording an identification program according to the present disclosure are useful for identifying a person who operates predetermined equipment.

What is claimed is:

1. An identification device comprising:
   a memory that stores instructions; and
   a processor that, when executing the instructions stored in the memory, performs operations comprising:
   receiving an image of a person photographed by a camera;
   identifying the person based on the image;
   detecting skeleton positions of parts, including at least a head and hands, of the person based on the image;
   identifying a motion of the person; and
   outputting the identified motion of the person,
   wherein the processor, when executing the instructions stored in the memory, further performs operations comprising:
   determining whether or not a skeleton detection is possible based on the detected skeleton positions,
   when it is determined that the skeleton detection is possible, identifying the motion of the person based on the detected skeleton positions, and
   when it is determined that the skeleton detection is not possible, identifying the motion of the person based on the identified person, the detected skeleton positions and a motion model in which a motion of each of a plurality of persons is registered.

2. The identification device according to claim 1, wherein the processor, when executing the instructions stored in the memory, further performs operations comprising:
   generating a motion model based on the identified person, the detected skeleton positions, and the identified motion of the person, and
   storing the generated motion model.

3. The identification device according to claim 1, wherein the processor, when executing the instructions stored in the memory, further performs operations comprising:
   determining whether or not the motion model is available when it is determined that the skeleton detection is not possible, and
   identifying the motion of the person based on the identified person, the detected skeleton positions, and the motion model and outputting the identified motion of the person, when it is determined that the motion model is available.

4. The identification device according to claim 1, wherein it is determined that the skeleton detection is possible when all of the skeleton positions are detected, and
   it is determined that the skeleton detection is not possible when some of the skeleton positions are detected.

5. An identification method comprising:
receiving an image of a person photographed by a camera;
identifying the person based on the image;
detecting skeleton positions of parts, including at least a head and hands, of the person, based on the image;
identifying a motion of the person;
outputting the identified motion of the person,
wherein the identification method further comprising:
determining whether or not a skeleton detection is possible based on the detected skeleton positions,
when it is determined that the skeleton detection is possible, identifying the motion of the person based on the detected skeleton positions, and
when it is determined that the skeleton detection is not possible, identifying the motion of the person based on the identified person, the detected skeleton positions and a motion model in which a motion of each of a plurality of persons is registered.

6. A non-transitory computer readable recording medium recording an identification program which is executed in a computer, the computer identifying a motion of a person, and which makes the computer execute:
receiving an image of the person photographed by a camera;
identifying the person based on the image;
detecting skeleton positions of parts, including at least a head and hands, of the person based on the image;
identifying a motion of the person;
outputting the identified motion of the person,
wherein the identification program further makes the computer execute:
determining whether or not a skeleton detection is possible based on the detected skeleton positions,
when it is determined that the skeleton detection is possible, identifying the motion of the person based on the detected skeleton positions, and
when it is determined that the skeleton detection is not possible, identifying the motion of the person based on the identified person, the detected skeleton positions and a motion model in which a motion of each of a plurality of persons is registered.

* * * * *